United States Patent [19]

Polk et al.

[11] 4,374,383

[45] Feb. 15, 1983

[54] CAPACITIVE TRANSDUCER FOR SENSING A HOME POSITION

[75] Inventors: Darryl R. Polk, Austin; Errol R. Williams, Jr., Round Rock, both of Tex.

[73] Assignee: International Business Machines Corporation, Armonk, N.Y.

[21] Appl. No.: 219,081

[22] Filed: Dec. 22, 1980

[51] Int. Cl.³ .................. G01R 27/26; G08C 19/16
[52] U.S. Cl. ........................... 340/870.37; 318/662; 324/61 R; 340/347 P
[58] Field of Search ............. 318/602, 604, 605, 662; 340/840.37, 347 P; 324/61 R, 61 P, 72

[56] References Cited

U.S. PATENT DOCUMENTS

| | | |
|---|---|---|
| 3,222,668 | 12/1965 | Lippel . |
| 3,238,523 | 3/1966 | Masel et al. . |
| 3,380,048 | 4/1968 | Sepich et al. . |
| 3,500,382 | 3/1970 | Rochette ........................ 340/347 P |
| 3,702,467 | 11/1972 | Melnyk . |
| 3,873,916 | 3/1975 | Sterki ............................ 340/870.37 |
| 3,938,113 | 2/1976 | Dobson et al. . |
| 3,961,318 | 6/1976 | Farrand et al. ................. 340/870.37 |
| 4,040,041 | 8/1977 | Fletcher et al. . |

OTHER PUBLICATIONS

"Dual Plane Capacitive Coupling Encoder", by R. J. Flaherty, M. L. Sendelweck, and J. W. Woods, *IBM Technical Disclosure Bulletin*, vol. 15, No. 4, Sep. 1972, pp. 1373–1375.

"Electrondynamic Velocity and Position Sensor and Emitter Wheel", by H. E. Naylor, III, and R. A. Williams, *IBM Technical Disclosure Bulletin*, vol. 16, No. 10, Mar. 1974, pp. 3303–3305.

*Primary Examiner*—Thomas A. Robinson
*Attorney, Agent, or Firm*—J. B. Kraft

[57] ABSTRACT

A rotational shaft home position sensing transducer is provided which comprises a rotor mounted on the shaft having a planar surface with a first radial array of conductive elements on the surface in combination with a fixedly mounted stator having a planar surface parallel to the planar rotor surface and a second corresponding radial array of conductive elements on the stator surface adjacent and spaced from the first array. The structure further contains a unit for applying an alternating electrical signal to the first array of elements and a unit connected to the second array of elements for sensing the capacitive effect induced in the second array by said electrical signal. The first and second arrays must be arranged so that a single home position in the relative motion between the rotor and stator will induce a single unique capacitive effect in the second plurality of elements. Particularly, the number of elements in the first and second array and their arrangement would be such that there is only a single rotational home position whereat all the elements in the first array are respectively aligned with the corresponding elements of the second array which will induce the single unique capacitive effect in this second array.

8 Claims, 4 Drawing Figures

CAPACITIVE TRANSDUCER FOR SENSING A HOME POSITION

BACKGROUND OF THE INVENTION

1. Field of the Invention

This invention relates to angular position sensing transducers and more particularly to capacitive position sensing transducers.

2. Description of the Prior Art

Angular shaft position sensing devices have been extensively used for many years. Traditionally, such position sensing transducers have been either magnetic sensing transducers or optical sensing transducers. However, in the past decade, capacitive position sensing transducers have been increasing in interest to the art. Capacitive transducers have been less sensitive to stray noise than either magnetic or optical transducers. Unlike the optical transducer, the capacitive transducers are not sensitive to ambient light and unlike the magnetic transducer, the capacitive transducer is not sensitive to stray magnetic fields. In addition, the capacitive transducer is less sensitive to the effects of accumulated dust than the other transducers. Also, optical transducers have a greater operating life than other transducers. Capacitive transducers are lower in cost than optical transducers.

Some representative prior art description of capacitive transducer technology may be found in the following:

"Dual Plane Capacitive Coupling Encoder", authored by R. J. Flaherty, M. L. Sendelweck, and J. W. Woods, *IBM Technical Disclosure Bulletin,* Vol. 15, No. 4, September 1972.

"Electrodynamic Velocity and Position Sensor and Emitter Wheel", authored by H. E. Naylor, III, and R. A. Williams, *IBM Technical Disclosure Bulletin,* Vol. 16, No. 10, March 1974.

U.S. Pat. No. 3,702,467, "Shaft Position Sensing Device", George Melnyk, Issued Nov. 7, 1972.

U.S. Pat. No. 3,938,113, "Differential Capacitive Position Encoder", D. R. Dobson et al, Issued Feb. 10, 1976.

U.S. Pat. No. 4,040,141, "Twin-Capacitive Shaft Angle Encoder with Analog Output Signal", J. C. Fletcher et al, Issued Aug. 2, 1977.

In substantially all systems involving rotational shaft positioning, e.g., stepper motors, a homing procedure must be provided. In both closed loop stepper motor systems where the position of the stepper motor is dependent upon transducer sensed feedback and in open loop stepper motor systems where shaft positioning is not dependent on such feedback, means must be provided for sensing the home position of the stepper motor. In rotational shaft positioning systems such as stepper motors, the capability of quickly and easily sensing the home position is very important in initializing system operation, periodically checking on shaft positions and for various forms of equipment diagnostics.

In most magnetic and optical shaft position sensing systems, it has become conventional to provide a magnetic or optical transducer device for sensing the home position which is separate from the transducer device which senses all the other positions. Since all position sensing with magnetic or optical transducers is dependent upon a count of sensed positions from the initial or home position, a separate home positioning sensing device is generally used to determine the home position from which the other position sensing device may commence its positional count. It should be noted that apparatus which uses a magnetic or optical device to sense the various positions of the shaft need not use a corresponding optical or magnetic device for sensing the home position; home position could be sensed with a simple electrical contact or a mechanical detent.

While as set forth hereinabove, capacitive transducers have been of increasing importance in sensing rotational shaft positions, the use of such transducers for sensing home positions has presented a problem. Unlike optical or magnetic transducers wherein a single indicator at the home position will provide a sufficiently discernible signal so that the home position can be determined, in capacitive sensing, a single indicator at the home position will customarily produce a signal which is so weak that it may not be discernible from general noise.

SUMMARY OF THE PRESENT INVENTION

The present invention provides a capacitive transducer for sensing a single home position by providing a signal at the home position which is clearly distinguishable from signals at all other rotational positions and from noise. In accordance with the present invention, a capacitive transducer for sensing a home position of a first moving member with respect to a second adjacent member is provided which comprises a transmitter portion on one of the members having a planar surface and a first plurality of conductive elements arranged in a line on said surface in combination with a receiver portion on the other member having a planar surface and a second plurality of corresponding conductive elements arranged in a line on said receiver surface; the second line of elements are adjacent to and spaced from the first line of elements. Means are provided for applying an alternating electrical signal to the first plurality of elements and means are connected to the second plurality of elements for sensing the capacitive effect induced in said second elements by said electrical signal. The first and second plurality of elements are arranged so that only a single home position in the relative motion between the two members will induce a single unique capacitive effect in the second plurality of elements.

As applied to the conventional sensing of home position of a rotating shaft, the first and second plurality of elements are respectively arranged in circular lines so that each group of elements form a radial array. The number of elements in the two corresponding radial arrays and the arrangement of said elements in their respective arrays is selected so that there is only a single rotational home position whereat all the elements in the first array are respectively aligned with the corresponding elements in the second array to induce a unique capacitive effect in the second array.

BRIEF DESCRIPTION OF THE DRAWINGS

Referring now to the drawings, wherein a preferred embodiment of the invention is illustrated, and wherein like reference numerals are used throughout to designate like parts.

BRIEF DESCRIPTION OF THE PREFERRED EMBODIMENT

Figure 1:
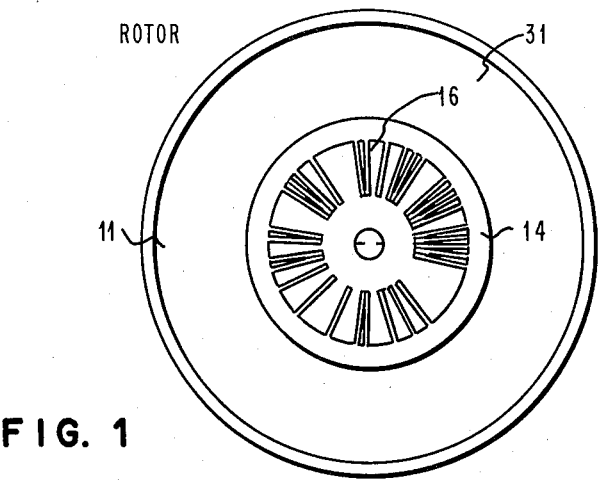
FIG. 1 is a diagrammatic plan view of the planar surface on the rotor which contains one of the radial arrays of conductive elements forming a portion of the transducer of the present invention.
Figure 2:
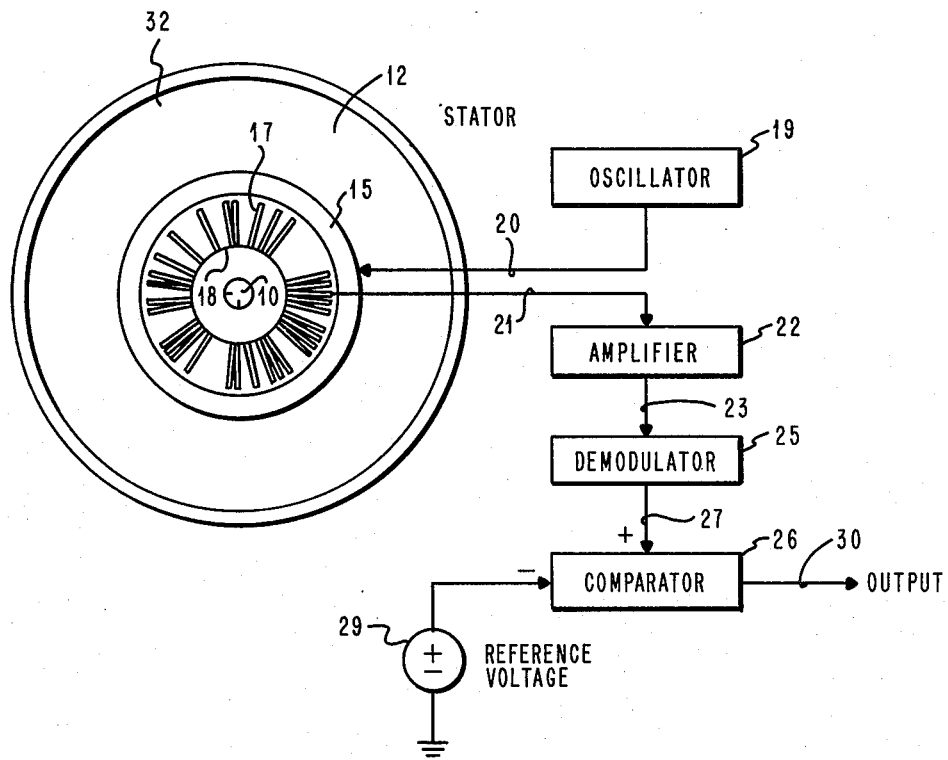
FIG. 2 is a diagrammatic plan view of the stator surface containing the other radial array of elements forming the present transducer together with a circuit logic drawing of circuitry necessary to provide the alternating electrical signal and to monitor the induced capacitive effect.
Figure 3:
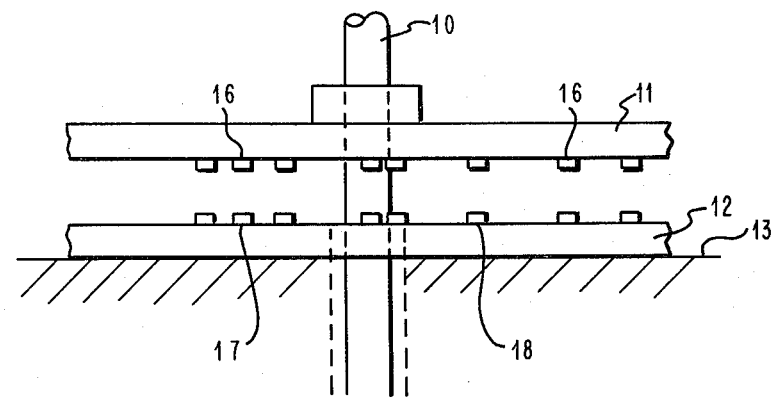
FIG. 3 is an enlarged diagrammatic fragmentary side view showing the rotor and stator of FIGS. 1 and 2 mounted on a shaft to illustrate the position of the conductive element arrays in the rotor and stator with respect to each other.

With reference to FIGS. 1, 2 and 3, in the preferred embodiment of the present invention, rotatable shaft 10 has rotor 11 mounted thereon so that the shaft 10 and rotor 11 rotate with respect to stator 12 which is affixed to the frame 13 of the equipment. The rotor and stator respectively contain mating conductive plates 14 and 15 which are spaced from each other but capacitively coupled when a voltage level is applied to plate 15 as will be subsequently described. For convenience of illustration, in the side view of FIG. 3, conductive plates 14 and 15 have been broken away. A radial array of conductive elements or fingers 16 extend from conductive plate 14 in the rotor while a corresponding array of fingers 17 extend from conductive ring 18. The array of fingers 16 on the rotor correspond in number and disposition with the array of fingers 17 in the stator. As will be hereinafter described in greater detail, the number and disposition of fingers 16 and 17 is selected so that there can be only a single position in each complete 360° rotation of rotor 11 whereat each of fingers 16 is in registration with each corresponding finger 17. This registration provides a home position of rotor 11 with respect to stator 12.

Considering now the operation of the transducer of the present invention, oscillator 19 (FIG. 2) produces an output on line 20 which is applied to conductive plate 15 in the stator. Oscillator output on line 20 is shown in the timing chart in FIG. 4. This oscillator output is to be applied to fingers 16 on rotor 11. Since it is conventional practice not to couple any lines directly to the rotor on the rotating shaft, the output of oscillator 19 is applied to fingers 16 through the capacitive coupling provided by conductive plates 15 and 14. The area of these capacitively coupled plates 14 and 15 is so substantial in relation to the spacing between the plates that the amplitude of the oscillator output which is applied to fingers 16 is only minimally diminished. The array of fingers 16 is in turn capacitively coupled to finger array 17 which is in turn connected to amplifier 22 through line 21 which amplifies the voltage level capacitively induced in fingers 17 by rotating finger array 16.

Figure 4:
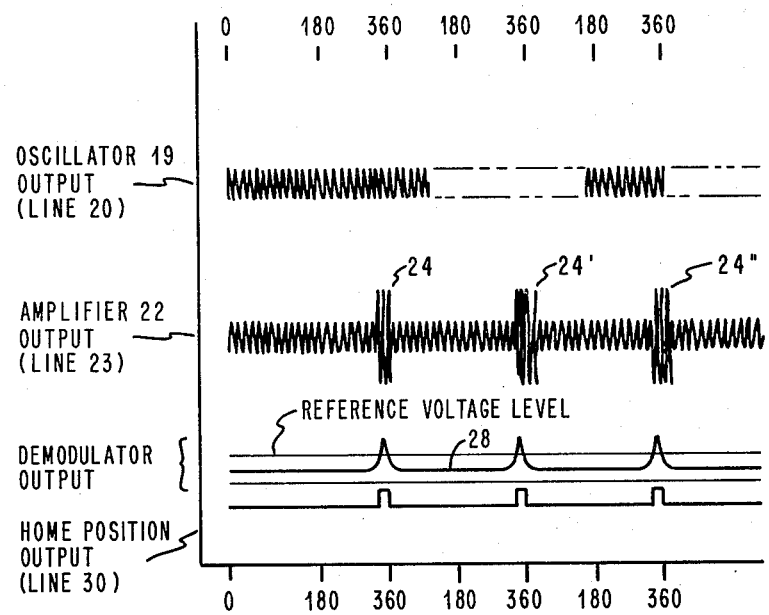
FIG. 4 is a timing graph showing the electrical outputs of the circuit logic elements in FIG. 2 relative to rotational shaft positions.

The amplifier output on line 23 is shown in the waveform timing chart of FIG. 4. It is noted that the waveform output from amplifier 22 on line 23 displays amplitude peaks once every 360° of rotation at points 24, 24′, and 24″. These peaks represent the points wherein the array of fingers 16 on rotor 11 are in exact registration with the array of fingers 17 on stator 12. The output of amplifier 22 is applied to demodulator 25 via line 23. The output of demodulator 25 is applied to comparator 26 via line 27. The demodulator output which is applied to comparator 26 is shown as waveform 28 is the timing graph in FIG. 4. Waveform 28 is in effect the demodulated envelope of the output of amplifier 22. Comparator 26 compares the output of demodulator 25 with a reference voltage level shown in the timing graph of FIG. 4 which is provided from reference source 29 to provide an output on line 30 which is shown in the timing graph of FIG. 4. This output has a pulse once every rotation which is indicative of the home position whereat the fingers in array 16 are in registration with the fingers in array 17.

Some typical operational parameters which may be used in connection with the structure and circuitry described above are a rotor rotating at 20 rps, an oscillator 19 output having a voltage swing of 12 volts at a frequency of 1 MHz, and an amplifier which provides an amplified output yielding a demodulated envelope when applied to demodulator 25 which has voltage peaks at the home position 2 volts greater than the flat portion of the waveform.

It has been set forth above that the fingers in radial arrays 16 and 17 are of a selected number and disposition such that there will be only a single position for each complete 360° rotation of rotor 11 whereat each of array of fingers 16 are in registration with each of the corresponding fingers 17 in the stator array. To achieve this result, the number and disposition of fingers 16 and 17 are selected to provide an uncorrelated maximal length linear sequence for the selected number of finger positions. For any selected number of fingers, the disposition of the fingers in order to provide the uncorrelated maximal length linear sequence for that number of fingers may be determined by principles well known in the communications field particularly with respect to error correcting and diagnostic codes. For example, attention is directed to the text, *Error Correcting Codes* by W. W. Peterson, The MIT Press, 1961 particularly at pages 147 through 149. Applying the principles of this technology, if we consider the rotating sequence of fingers 16 in the rotor array to be equivalent to a recurring binary sequence of present or absent fingers, i.e., the presence of a finger 16 at a position is the equivalent of a 1 while its absence is the equivalent of a binary 0, then we, in effect, have a binary sequence which is repetitive with each 360° rotation of the rotor. In following the conventional techniques for determining the number of finger positions needed to produce such a maximal length linear sequence, we utilize the equation $P = 2^n - 1$, where P is the quantity of possible element (finger) positions and n is a positive integer. For example, if we select an integer 8 for the value of n, then $P = 63$. Thus, in arranging the pattern of fingers 16 and 17, respectively in the rotor and stator arrays, there will be 63 possible positions at which a finger may be located. Then, following the teaching from the error correcting code art, it is determined that if at the 63 possible finger positions constituting one 360° rotation, thirty-one fingers are arranged in the positions respectively shown in the rotor or stator arrays of FIGS. 1 and 2, then there will only be a single position in each complete rotation of rotor 11 at which fingers 16 will be in registration with fingers 17.

It should be noted that in the rotor and stator structure used to practice the invention, the apparatus for determining various shaft positions once the home position has been determined has not been described. Any of the conventional position sensing capacitive transducers described in the above listed prior art may be respectively disposed in areas 31 on the rotor and 32 on the stator. For example, any appropriate rotor grating pattern may be disposed in area 31 with a corresponding stator grating pattern disposed in area 32, and these patterns in combination with standard capacitive transducer sensing circuitry as described in said patents may be used for general positional transducer sensing once the home position has been determined.

While the invention has been particularly shown and described with reference to a preferred embodiment it will be understood by those skilled in the art that various other changes in form and detail may be made without departing from the spirit and scope of the invention.

What is claimed is:

1. A capacitive transducer for sensing a home position of a first moving member with relation to a second adjacent member comprising:
   a transmitter portion on one of said members having a planar surface and a first plurality of conductive elements arranged in a line on said surface,
   a receiver portion on the other of said members having a planar surface and a second plurality of conductive elements on said receiver surface corresponding in number and arrangement to said first plurality of conductive elements, said second plurality of elements being adjacent to and spaced from said first line of elements,
   means for applying an alternating electrical signal to said first plurality of elements, and
   means connected to said second plurality of elements for sensing the capacitive effect induced in said second elements by said electrical signal,
   said first and second pluralities of elements being arranged in a non-repetitive pattern so that only a single home position in the relative motion between said two members will induce a single unique capacitive effect in said second plurality of elements.

2. The capacitive transducer of claim 1 wherein said first and second pluralities of elements are respectively arranged along circular lines whereby said transducer senses a rotational home position.

3. The capacitive transducer of claim 2 wherein the number of elements in said first and second pluralities and the arrangement of said elements along their respective lines are selected so that there is only a single rotational home position whereat all of the elements in said first plurality are respectively aligned with corresponding elements in said second plurality to induce said single unique capacitive effect in said second plurality of elements.

4. The capacitive transducer of claim 3 wherein said unique capacitive effect is a voltage level which is on one level for all non-home positions and at a substantially different level for said home position.

5. A rotational shaft home position sensing transducer comprising:
   a rotor mounted on said shaft having a planar surface and a first radial array of conductive elements on said surface,
   a fixedly mounted stator having a planar surface parallel to said planar rotor surface and a second radial array of conductive elements on said stator surface corresponding in number and arrangement to said first radial array, adjacent to and spaced from said first array,
   means for applying an alternating electrical signal to said first array of elements, and
   means connected to said second array of elements for sensing the capacitive effect induced in said second array by said electrical signal,
   said first and second arrays being arranged in a non-repetitive pattern so that only a single home position in the relative motion between said rotor and stator will induce a single unique capacitive effect in said second plurality of elements.

6. The capacitive transducer of claim 5 wherein the number of elements in said first and second arrays and the arrangement of said elements in their respective arrays are selected so that there is only a single rotational home position whereat all of the elements in said first array are respectively aligned with corresponding elements in said second array to induce said single unique capacitive effect in said second array of elements.

7. The capacitive transducer of claim 6 wherein said unique capacitive effect is a voltage level which is on one level for all non-home positions and at a substantially different level for said home position.

8. The capacitive transducer of claim 7 wherein
   the elements in said first array and in said second array are respectively arranged in a plurality of radial element positions, the quantity of said element positions in each of said arrays being determined by the equation:
   $P = 2^n - 1$, where P is the quantity of element positions and n is a positive integer, and
   the selected number and arrangement of said elements in said element positions providing an uncorrelated maximal length linear sequence of elements for $2^n - 1$ element positions.

* * * * *

UNITED STATES PATENT AND TRADEMARK OFFICE
CERTIFICATE OF CORRECTION

PATENT NO. : 4,374,383
DATED : 15 February 1983
INVENTOR(S) : D. R. Polk and E. R. Williams, Jr.

It is certified that error appears in the above-identified patent and that said Letters Patent are hereby corrected as shown below:

Col. 1, line 44, delete "4,040,141" and substitute --4,040,041--.

Signed and Sealed this

Twenty-first Day of June 1983

[SEAL]

Attest:

DONALD J. QUIGG

Attesting Officer

Acting Commissioner of Patents and Trademarks